(12) United States Patent
Simonov et al.

(10) Patent No.: US 8,057,343 B2
(45) Date of Patent: Nov. 15, 2011

(54) PLATE-LINK CHAIN FOR A MOTOR VEHICLE DRIVE SYSTEM

(75) Inventors: Anton Simonov, Bühl (DE); Michael Pichura, Bühl (DE); Olga Ispolatova, Bühl (DE); Marcus Junig, Bühlertal (DE); Martin Vornehm, Wooster, OH (US)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 11 days.

(21) Appl. No.: 11/827,664

(22) Filed: Jul. 12, 2007

(65) Prior Publication Data
US 2008/0020884 A1    Jan. 24, 2008

Related U.S. Application Data

(60) Provisional application No. 60/832,791, filed on Jul. 24, 2006.

(30) Foreign Application Priority Data

Jul. 13, 2006  (DE) .......................... 10 2006 032 409

(51) Int. Cl.
*F16G 13/04*    (2006.01)
(52) U.S. Cl. ...................................................... 474/215
(58) Field of Classification Search .................. 474/157, 474/202, 206, 212, 214–217
See application file for complete search history.

(56) References Cited

U.S. PATENT DOCUMENTS

| | | | | |
|---|---|---|---|---|
| 1,469,391 A | * | 10/1923 | Morse | 474/216 |
| 1,825,675 A | * | 10/1931 | Morse | 474/216 |
| 2,602,344 A | * | 7/1952 | Bremer | 474/215 |
| 2,653,485 A | * | 9/1953 | MacArthur | 474/215 |
| 3,742,776 A | * | 7/1973 | Avramidis | 474/215 |
| 4,801,289 A | * | 1/1989 | Sugimoto et al. | 474/215 |
| 5,026,331 A | * | 6/1991 | Sugimoto et al. | 474/214 |
| 5,236,399 A | * | 8/1993 | Sugimoto et al. | 474/215 |
| 5,242,333 A | * | 9/1993 | Sugimoto et al. | 474/212 |
| 5,242,334 A | * | 9/1993 | Sugimoto et al. | 474/215 |

(Continued)

FOREIGN PATENT DOCUMENTS

JP   55135251 A  * 10/1980
(Continued)

OTHER PUBLICATIONS

WO 2008006332 Search Report., Oct. 26, 2007.*

*Primary Examiner* — Robert Siconolfi
*Assistant Examiner* — Stephen Bowes
(74) *Attorney, Agent, or Firm* — Alfred J. Mangels (57) ABSTRACT

A plate-link chain for a motor vehicle drive system. The chain includes a number of link plates hingedly connected with each other by rocker members that extend transversely to the longitudinal direction of the plate-link chain and are positioned in openings of the link plates. Curved contact surfaces are located on each of the rocker members and link plates, along which contact surfaces the rocker members and link plates are in contact with each other to transmit power. The rocker members are shaped asymmetrically in the height direction and are provided in contacting pairs. The link plate openings include at least one inwardly-curved region that is located above a contact point line extending through contact points of contacting rocker members of adjacent rocker member pairs that roll against each other.

6 Claims, 5 Drawing Sheets

U.S. PATENT DOCUMENTS

| | | | |
|---|---|---|---|
| 5,651,746 A * | 7/1997 | Okuda | 474/215 |
| 6,277,046 B1 * | 8/2001 | Ohara et al. | 474/217 |
| 6,387,003 B2 * | 5/2002 | Horie et al. | 474/215 |
| 2007/0010363 A1 | 1/2007 | Pichura et al. | 474/215 |
| 2007/0197329 A1 | 8/2007 | Simonov et al. | 474/215 |

FOREIGN PATENT DOCUMENTS

| | | |
|---|---|---|
| JP | 06159446 A * | 6/1994 |
| JP | 08074938 A * | 3/1996 |
| WO | WO 2006/058529 A1 | 6/2006 |
| WO | WO 2007/076778 A1 | 7/2007 |

* cited by examiner

PLATE-LINK CHAIN FOR A MOTOR VEHICLE DRIVE SYSTEM

BACKGROUND OF THE INVENTION

1. Field of the Invention

The present invention relates to a plate-link chain, in particular for a motor vehicle drive system, wherein the chain includes a large number of link plates that a pivotally connected with each other via rocker members, 2. Description of the Related Art In known plate-link drive chains the rocker members run transversely to the longitudinal direction of the chain and are positioned in openings provided in the link plates. There are curved contact surfaces situated on each of the rocker members and on opening surfaces of the link plates, along which contact surfaces the rocker members and link plates are in contact with each other to transfer power. The contact surfaces between rocker member and link plate are provided at upper and lower contact surface regions in the height direction of the rocker member, the opening in the link plate having at least one region that is curved in an inward direction.

The rocker members also have curved rolling surfaces, along which contacting rocker members roll against each other to transfer power. Further, the rocker members are shaped asymmetrically in the height direction of the rocker members, when viewed in a cross section extending in the longitudinal direction of the chain.

Such a known plate-link chain can be a toothed chain, which can be employed in a power divider transmission of a motor vehicle, for example, or as a drive chain for an auxiliary unit of an internal combustion engine of the motor vehicle. The plate-link chain can be designed as a toothed chain to transmit tractive force between a driving and a driven chain wheel. But a plate-link chain of the general type described above can also be employed as a means of transmitting tractive force in a belt-driven, conical-pulley transmission, or the like, for example, and can there transmit the tractive force by means of frictional contact between the ends of the rocker members and the conical disk surfaces of the two conical disk pairs.

A plate-link chain designed as a toothed chain normally includes a device for tensioning the toothed chain in the slack strand. The device for tensioning the toothed chain serves to prevent pulsating of the toothed chain due to vibration excitation, for example, and also to shape the entry process of the teeth of the toothed chain onto a chain wheel so that tooth skipping is prevented. On the chain wheels the toothed chain is deflected in such a way that the center of curvature of the portion of the toothed chain that is curved in the region of the deflection lies within the closed chain section.

In contrast, when a chain tensioner is in the form of a chain tensioning bar acting on the back of the link plates, for example, the toothed chain undergoes a curvature that differs from the curvature that occurs in the region of the deflection. The particular portion of the toothed chain that is acted on by the chain tension is curved in the opposite direction, and the center of curvature of that portion of the toothed chain lies outside of the closed chain section of the plate-link chain.

To limit the deflection angle of that swing-back mode from the stretched position, in known versions of plate-link chains for belt-driven conical-pulley transmissions, for example, and in toothed chains, there is provision for limiting the swing-back in the joint of the lower region of an adjacent link plate.

The mode of functioning here is such that a rocker member comes into contact with a region of the lower contact surface of the adjacent link plate. Thus the striking of the rocker member on the contact surface of the adjacent link plate occurs in a region that is already critically loaded in any event, due to the transmission of tensile force from the rocker member to the link plate. Hence, in the region of concentrated tension due to the transmission of tensile force, yet another additional overlay of forces occurs, and thereby also tension due to the swing-back protection. In the operation of the toothed chain that arrangement can result in increased wear and ultimately to early fatigue failure. The fatigue strength of the toothed chain is thus reduced.

Plate-link chains that were known in the past had symmetrical rocker members that were situated in openings in the link plates. Those known rocker members are symmetrical in construction in reference to a plane of symmetry that divides the rocker members into an upper and a lower half. As a result of that configuration, a distance from the inner peripheral rim of the link plate opening that receives the rocker members, to an outer peripheral edge of the link plate in the region of a so-called lower yoke is made smaller, and thus the cross-sectional region available for transmitting force is reduced in size.

In consequence, a concentration of stress appears in the region of the link plate between the opening of the link plate and the edge of the link plate, which ultimately results in a reduction of the service life and of the force-transmitting capability of the plate-link chain. To counter that problem, a plate-link chain is known that has asymmetrical rocker members in the direction of the rocker member height, and thereby ensures that the workpiece stresses that arise in the upper and lower contact surface regions between rocker member and link plate are significantly reduced, so that the service life of the chain is increased as a result.

With a plate-link chain of that type it is important that the asymmetrical rocker members are inserted into the openings in the link plates in the correct orientation, since otherwise the rolling surfaces of the rocker members that are intended for transmitting force cannot roll against each other as intended. As a result, jamming of the rocker members in the link plate opening can occur, and thus a malfunction that can result in failure of the plate-link chain.

To achieve the correct orientation of the rocker members in the link plate openings, a plate-link chain is disclosed in unpublished German patent application DE 10 2005 061 081.1. In that chain the link plates have a region in the plate opening that is curved in an inward direction, so that if the rocker members are oriented incorrectly an overlapping of the outside contour of the rocker members with the inside contour of the plate opening occurs, and the rocker member that is not in the correct orientation can no longer be inserted into the link plate opening. In that way erroneous installation of the rocker members in the openings of the link plates is avoided.

It has been found that that known plate-link chain already provides an improvement, compared to the plate-link chain described previously, in regard to additional stress at the stress-critical region in the region of the lower loop of the link plate. But even that known plate-link chain has room for improvement in regard to the stress in the described stress-critical region to protect against swing-back due to the striking of the rocker member on a contact surface of an adjacent link plate.

Consequently, an object of the present invention is to refine the known plate-link chain in such a way that the force applied to the plate-link chain due to the striking of the rocker member on the link plate to limit the swing-back angle takes place in a less tension-critical region along the link plate opening.

SUMMARY OF THE INVENTION

The present invention relates to a plate-link chain, in particular for a motor vehicle drive system, with a large number of link plates that are pivotally connected with each other by rocker members. The rocker members extend transversely relative to the longitudinal direction of the plate-link chain and are positioned in openings of the link plates. Curved contact surfaces are located on each of the rocker members and the link plate openings, along which contact surfaces the rocker members and the link plates are in contact with each other to transmit force. Curved rolling surfaces are provided on the rocker members, along which surfaces the rocker members roll against each other to transmit force.

The rocker members are shaped asymmetrically in the height direction of the rocker members, as viewed in a cross section extending in the longitudinal direction of the plate-link chain. The contact surfaces between rocker member and link plate are provided on the upper and lower contact surface regions in the height direction of the rocker member, an inwardly-curved region in the cross-sectional view in the direction of the rocker member height being situated essentially above a contact point line extending through contact points of rocker members of adjacent rocker member pairs in a straight strand of the plate-link chain that roll against each other.

If a portion of the plate-link chain including a plurality of chain links is regarded, and that portion is formed into a straight chain strand, and that form corresponds to the plate-link chain in accordance with the invention in the straight strand, the rocker members lying opposite each other in openings of the link plates form a contact point on the rolling surfaces in each case. If that contact point is now connected by a line with a contact point of an adjacent rocker member pair, the result is a contact point line or contact line, on which all of the contact points of the straight strand of the plate-link chain lie.

The invention provides that the inwardly-curved region of the opening of the link plates in the height direction of the rocker members extends essentially above that contact point line or contact line, and not below that contact point line, as is the case with the plate-link chain described earlier. The configuration in accordance with the invention provides the benefit that the tension load on the link plate due to the striking of the rocker member or rocker pressure piece on the inwardly-curved region takes place at a region of the opening of the link plate which is substantially less stress-critical than the bottom of the link plate, i.e., the region of the lower contact surface of the link plate, which is already a region of increased stress concentration due to the transmission of force between rocker member and link plate. At the same time, partial regions of the inwardly-curved region can be situated below the contact line, but partial regions or all regions of the inwardly-curved region can be located above the contact line. The partial regions of the curved region that are relevant for the contact between rocker member and curved region are located above the contact line.

What that accomplishes is that in order to limit the swing-back angle the locus of the transmission of force between rocker member and link plate is shifted to a less stress-critical region of the link plate, so that the danger of early fatigue failure of the link plate, and thus of the plate-link chain, is reduced, and the fatigue strength of the plate-link chain in accordance with the invention increases significantly.

If we now consider a portion that includes a plurality of links of the plate-link chain in accordance with the invention, in a refinement the invention is also distinguished by the fact that rocker members from that portion of the plate-link chain that have a back surface in the region of the asymmetrical formation of the rocker members can be brought into contact with the curved region portion of the link plates when the portion is in a curved configuration whose center of curvature lies outside of a closed section of the plate-link chain.

If the closed chain section has a convex configuration, for example, in the regions of the two deflections, then the region of the plate-link chain that is affected by a chain tensioning device has a concave configuration, and the center of curvature of that region or portion of the plate-link chain affected by the chain tensioner lies outside of the closed section of the plate-link chain. The rocker members and the link plates are then configured in such a way that the rocker members from that portion can have their back surface in the region of the asymmetrical formation of the rocker members brought into contact with the curved region of the link plates to bring about a limiting of the swing-back angle of the portion, so that an enlargement of that swing-back angle is prevented because of the contact of the back surface with the inwardly-directed curved region of the link plate.

A refinement of the invention provides that the back surfaces of the rocker member that can be brought into contact with the inwardly-curved region of the link plate opening are configured in such a way that a bearing surface is established between the back surface and the curved region of the link plate. The result is that between the back surface in the asymmetrical region of the rocker members and the inwardly-curved region of the link plate opening a region is available for transmitting force, and a concentrated load does not occur between the back surface and the surface of the inwardly-curved region of the link plate.

As already mentioned earlier, one of the stress-critical regions of the link plate is located in the region between the two lower contact surfaces of the link plate. In order not to introduce additional forces into the link plate in the region of increased concentration of stress due to a transmission of force between rocker member and link plate in the case where the link plate swings back, a refinement of the invention provides that when the rocker member has a back surface in the asymmetrical region in contact with the inwardly-curved region of the link plate, a clearance space exists, which enlarges starting from a contact location between the contact surfaces of rocker member and link plate, between a lower contact surface of a rocker member and a lower contact surface of the link plate, so that in the event of swing-back the adjacent link plate is not additionally loaded with a tension overlay in the region of the stress-critical lower contact surfaces.

Depending upon what swing-back angle is preferred in the event of swing-back of the plate-link chain in accordance with the invention, a corresponding configuration of the back surface of the rocker members and of the inwardly-directed region of the link plates is possible, so that above a predefined threshold value of the swing-back angle of a portion of the plate-link chain the back surface comes into contact with the inwardly-curved region of an adjacent link plate, whereby a stop function is realized between the rocker member and the adjacent link plate to limit the swing-back angle.

The invention also provides a link plate for making a plate-link chain with the properties described above, where the link plate has two openings to receive two pairs of rocker members and each of the two openings has a region extending from a peripheral rim to the opening in the inward direction to form a stop surface for the back surface of a rocker member.

These respective inwardly-directed regions of the opening of the link plate are provided along the peripheral rim of the opening in a region which, when there are pairs of rocker members situated in the opening, is located above a contact line or contact point line that extends in a straight strand of the plate-link chain through contact points of rocker members of adjacent rocker member pairs that roll against each other. As a result of shifting that inwardly-directed region of the link plates above that contact point line, the rocker members have their back surfaces in the asymmetrical region in contact with the inwardly-directed region, which is less stress-critical than the region between the two lower contact surfaces of the respective openings of the link plate.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
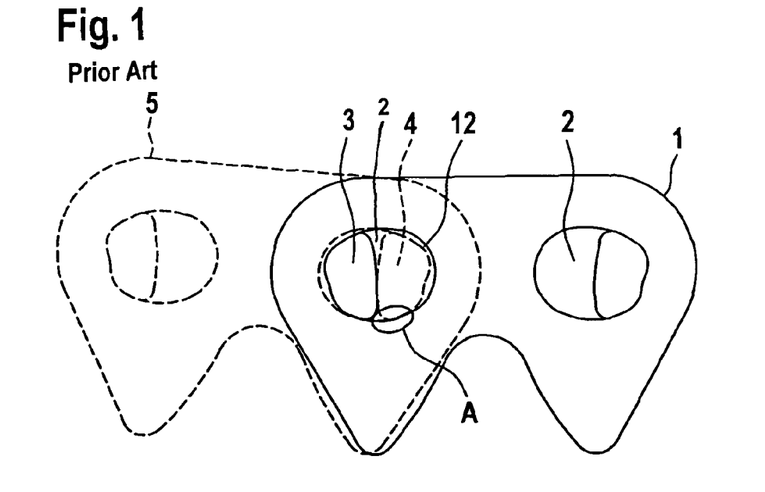
FIG. 1 is a fragmentary side view of a portion of a known plate-link chain in the form of a toothed chain in a swing-back mode.

FIG. 1 shows a portion of a known plate-link chain having two adjacent link plates 1 and rocker members 3,4 situated in openings 2. In that known plate-link chain, which is in the form of a toothed chain, during a swing-back mode that is illustrated by the dashed line link plate 5 and its pivotal movement in the upward direction in the plane of the drawing, contact takes place between the dashed line rocker member 4 of the dashed line link plate 5 and the link plate 1, shown with a solid line, in the region of link plate 1 and designated as region A at the bottom of the opening 2.

Figure 2:
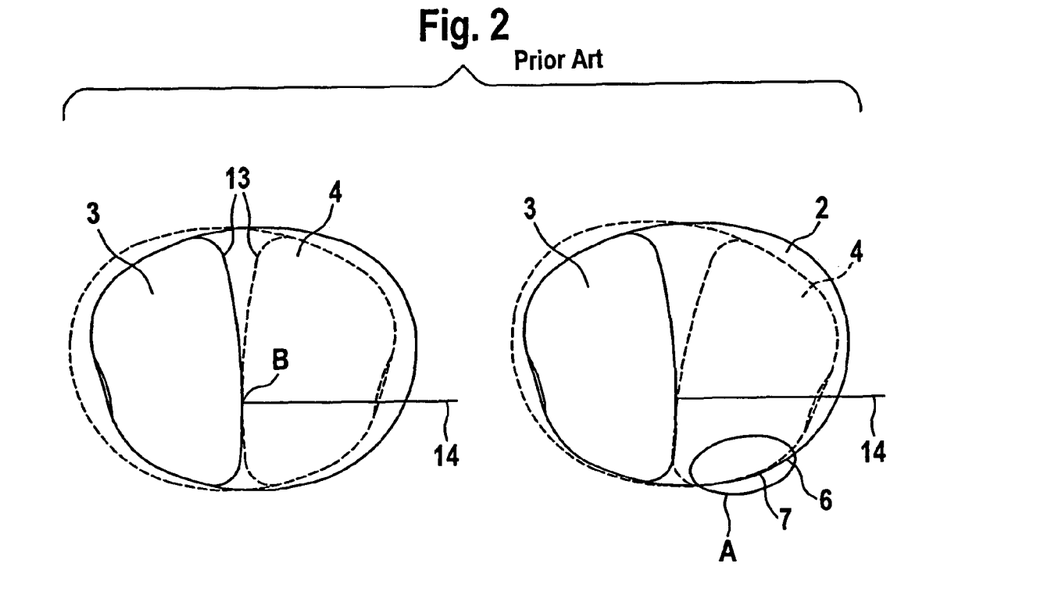
FIG. 2 shows two enlarged side views of the plate-link opening of the chain shown in FIG. 1 to explain the contact of a rocker member on a link plate during a swing-back mode.

FIG. 2 of the drawings shows in the right side of the figure an enlarged representation of the link plate opening 2, with rocker member 4 in pivoted position due to the pivotal movement of the dashed line link plate 5 in FIG. 1. Rocker member 3 is associated with the right-hand link plate 1 in FIG. 1, while rocker member 4 is associated with the left-hand link plate 5 in FIG. 1, so that when a pivotal movement of link plate 5 occurs during a swing-back of the toothed chain, a force-transmitting contact takes place between a lower contact surface 6 of rocker member 4 and a lower contact surface 7 of opening 2 of link plate 1.

Figure 3:
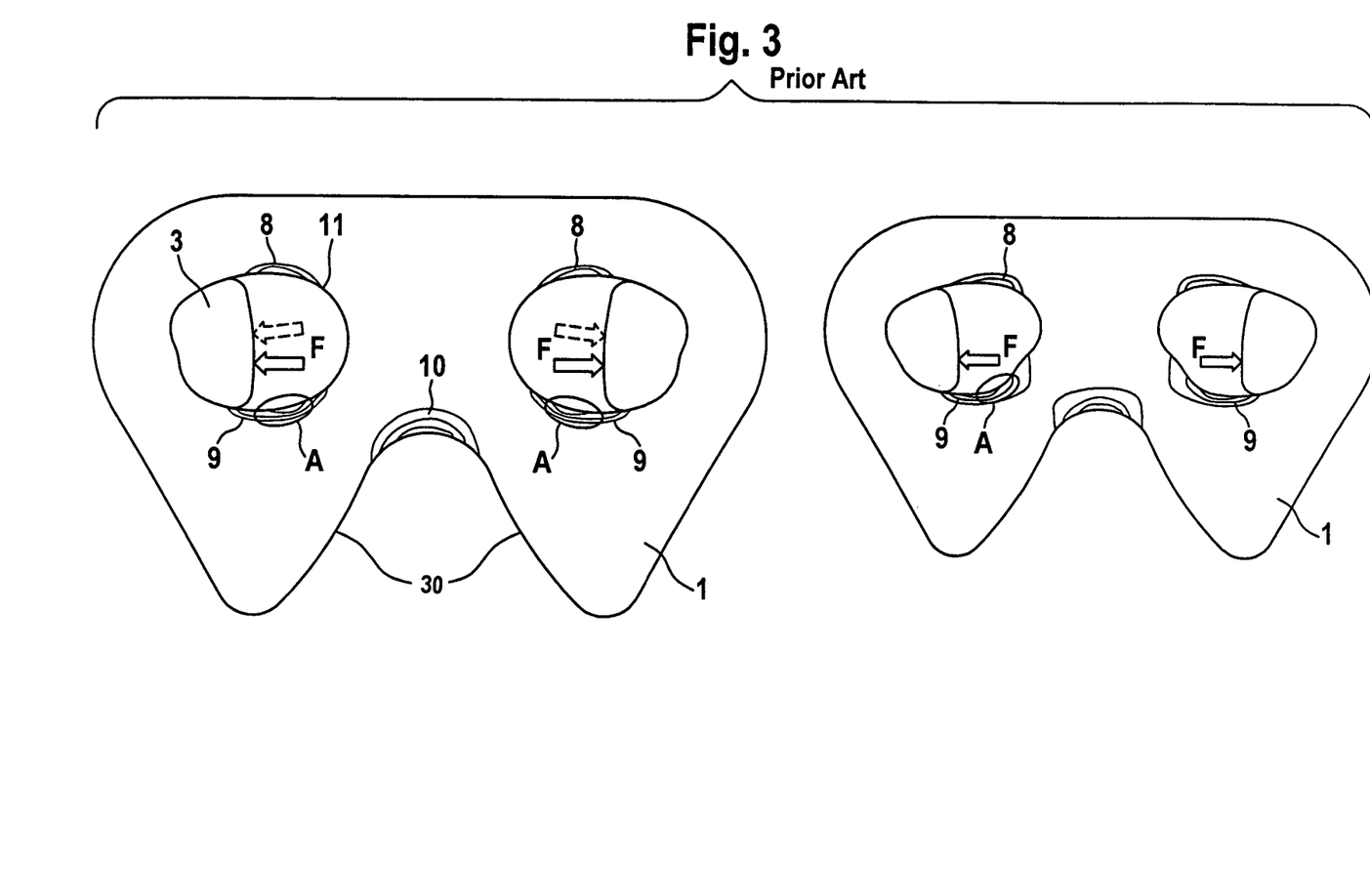
FIG. 3 shows two link plate views of the FIG. 1 chain to show areas of stress concentration.

But that contact region A is already a stress-critical region of link plate 1, as FIG. 3 of the drawing shows. Under the force F in the straight strand portion of the chain, as well as in the curved condition of the chain that occurs when the plate-link chain is diverted as it engages the chain wheel, link plate 1 has a stress-critical region 8 between an upper contact surface 11 of the link plate opening and an upper contact surface 12 (see FIG. 1) of rocker member 4. In a similar way, link plate 1 has a stress-critical region 9 in the region between the lower contact surface 6 of rocker member 4 and the lower contact surface 7 of link plate 1 (shown in FIG. 2).

The contact region between rocker member 4 and opening 2 of link plate 1 lies in stress-critical region A in the event of swing-back, as shown in FIGS. 1 and 2 of the drawings. Reference numeral 10 designates an additional stress-critical region of link plate 1 between the two teeth 30. If the known link plate in accordance with FIG. 1 is subjected to a swing-back, the striking contact between the lower contact surface 6 of rocker member 4 and the lower contact surface 7 of opening 2 of link plate 1 causes a superimposition of the resulting workpiece stresses with the stresses that already exist in region 9 due to the tensile force load in the stress-critical region 9. During operation, that additional stress can result in increased wear, and ultimately to a fatigue failure of link plate 1, with the result that the fatigue strength of the known plate-link chain is significantly reduced.

FIG. 2 of the drawings shows in the left side of the drawing contact point B between the two rocker members 3, 4 in the straight chain strand. The two rocker members 3, 4 roll against each other along a respective rolling surface 13, and form a contact point B in the straight strand. If that contact point B is connected by a line to a contact point B of another adjacent pair of rocker members, a contact point line or contact line 14 can be stretched between the two points B, which line connects the contact points B of adjacent rocker member pairs.

As shown in the right side of FIG. 2, in the event of swing-back in the known plate-link chain the contact region designated as A lies between rocker member 4 and link plate 1 below contact point line 14, considered in the height direction of the rocker members.

Figure 4:
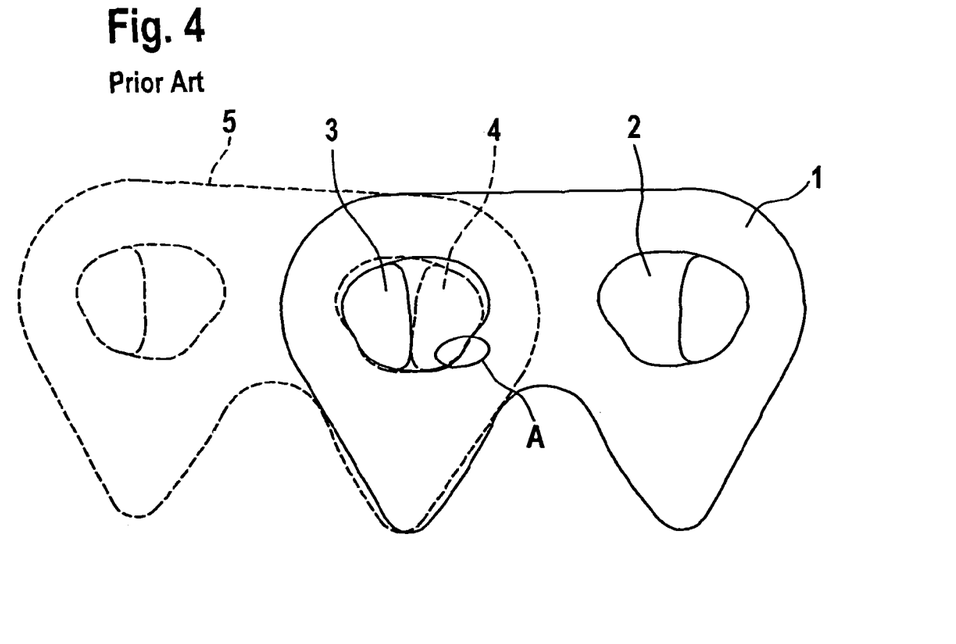
FIG. 4 is a fragmentary side view similar to FIG. 1 of the known plate-link chain in a swing-back condition.
Figure 5:
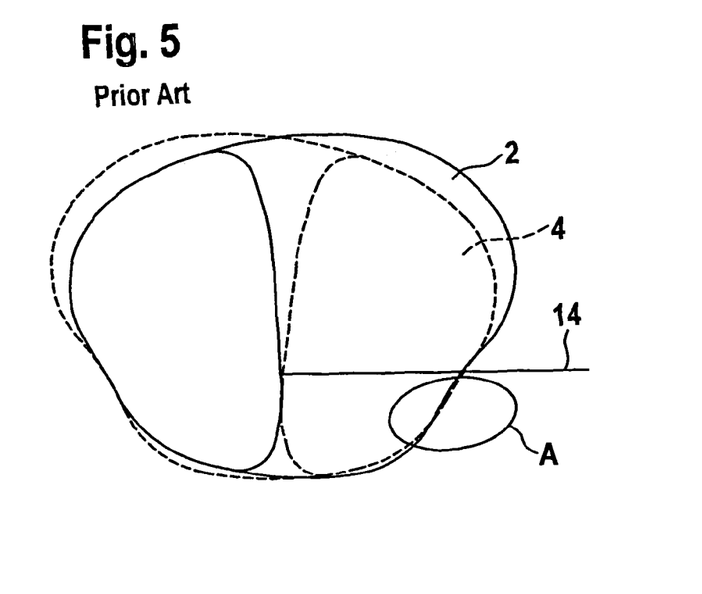
FIG. 5 is an enlarged view of a link plate opening and rocker members similar to the right-hand representation in FIG. 2 of the known plate-link chain shown in FIG. 4.

Similar circumstances are also illustrated in the known plate-link chain as shown in FIGS. 4 and 5, in which contact region A between rocker member 4 and link plate 1 is in fact at a higher position than in FIG. 2, relative to the lowermost region of opening 2, but it is still below contact point line 14 when regarded in the height direction of the rocker members. Hence, contact region A of the known plate-link chain in accordance with FIG. 4 is also situated in the vicinity of the stress-critical region 9, as shown in the right side of FIG. 3.

Figure 6:
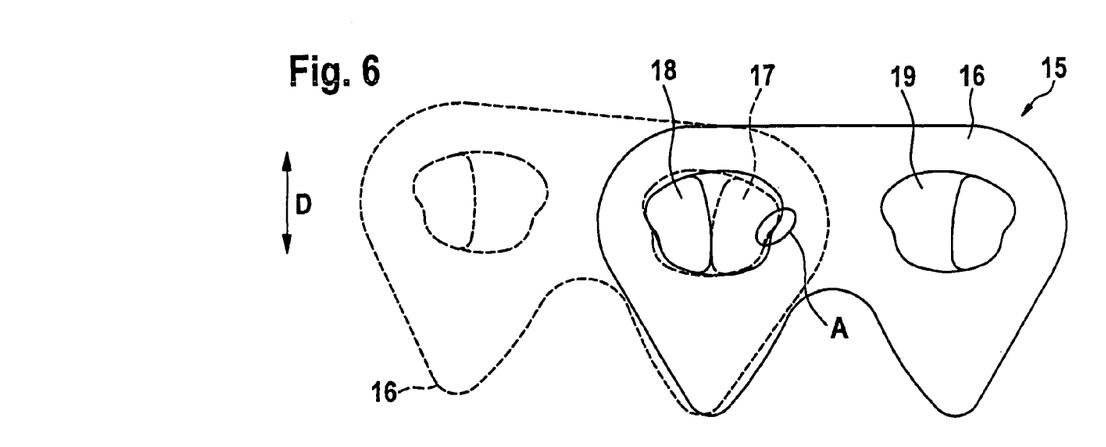
FIG. 6 is a fragmentary side view similar to FIG. 1 of a portion of an embodiment of a plate-link chain in accordance with the present invention.

FIG. 6 of the drawings shows the swing-back case for a plate-link chain 15 in accordance with the present invention. Plate-link chain 15, which is designed as a toothed chain, has a large number of link plates 16 and rocker members 17, 18.

Rocker members 17, 18 are inserted into openings 19 of link plates 16. As shown in the left side of FIG. 7, rocker members 17, 18 are asymmetrically formed in the height direction of the rocker members, with a wider region in the direction of double headed arrow C in the upper half of the rocker member than in the lower half of the rocker member. Opening 19 has an inwardly-curved region 20, but it is situated above contact point line 14.

Figure 7:
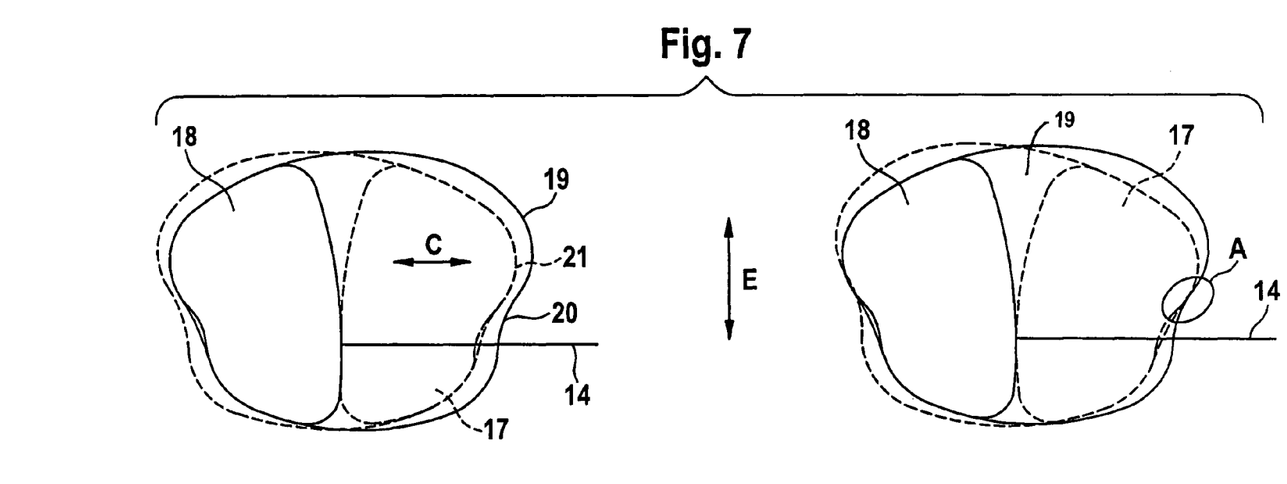
FIG. 7 is a view similar to FIG. 2 to illustrate the contact between a rocker member and a link plate in the plate-link chain in accordance with the present invention.

The right side of FIG. 7 shows an enlarged representation of the middle opening 19 of FIG. 6 with the two rocker members 17, 18. Here, rocker member 18 is a rocker member that is firmly supported in opening 19 of the right-hand link plate 16, while rocker member 17 is firmly supported in the corresponding opening of the left-hand link plate 16, which is shown by dashed line lines in FIG. 6.

If a swing-back movement occurs in the plate-link chain in accordance with FIG. 6, it results in a pivotal movement of the particular link plate in the direction of the double headed arrow D, and thus to a relative turning movement of the supported rocker member in the opening of the adjacent link plate, i.e., it results in FIG. 6 in a relative movement of rocker member 17 relative to opening 19 of the right-hand link plate 16.

As that movement takes place, the back surface 21 of rocker member 17 comes into contact with the inwardly-directed region 20 of opening 19, so that contact at contact region A arises as shown in the right-hand portion of FIG. 7, which is located above contact point line 14 in the height direction of the rocker member, relative to the direction indicated by double headed arrow E.

Consequently, there results a shift of contact region A from the stress-critical region 9 shown in FIG. 3, and thus in the event of swing-back there is a transmission of force between rocker member 17 and opening 19 of link plate 16, wherein the force transmission takes place between the back surface 21 and the inwardly-directed curved region 20 of opening 19 above contact point line 14.

Figure 8:
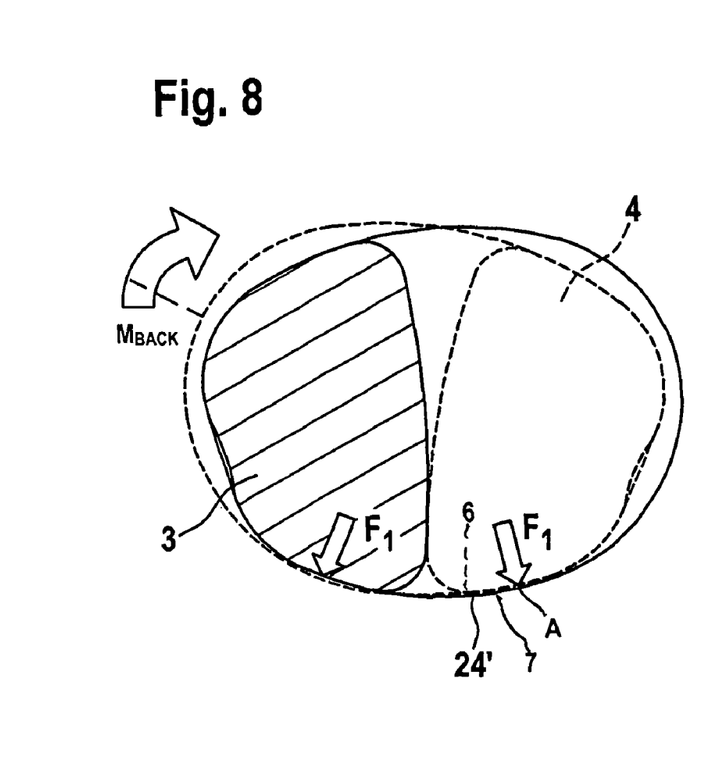
FIG. 8 is an enlarged view of a link plate opening of the known chain shown in FIG. 1 to illustrate the contact and force pattern between rocker member and link plate.

FIG. 8 shows the contact force $F_1$ resulting from a swing-back moment $M_{BACK}$ of the known plate-link chain in accordance with FIG. 1 of the drawing. As can be clearly seen, force $F_1$ occurs in the contact region at the lower contact surfaces 6, 7 of rocker member 4 and of link plate 1, designated as contact region A in FIG. 1, and thus in stress-critical regions 9 shown in FIG. 3 of the drawings.

Figure 9:
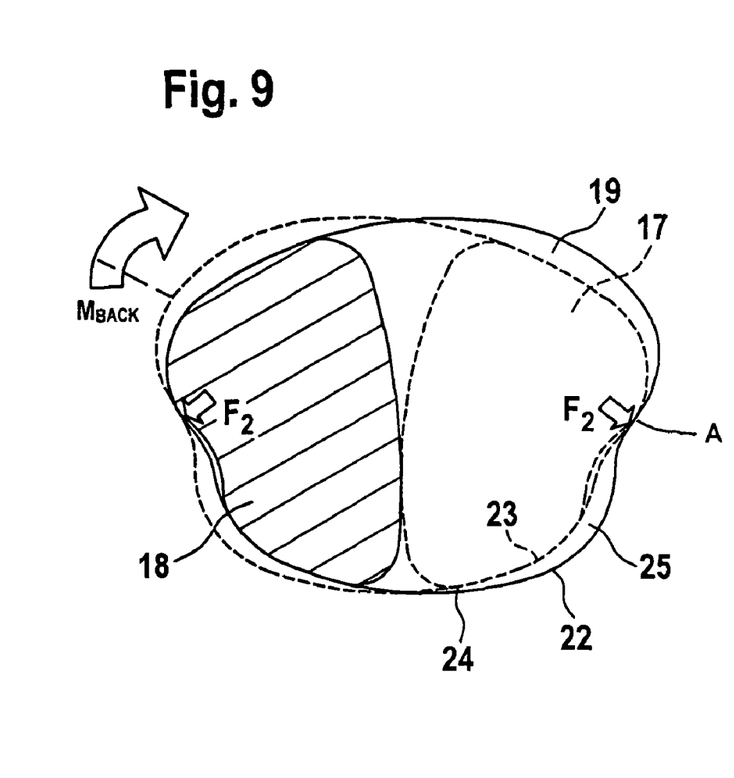
FIG. 9 is an enlarged view similar to FIG. 8 to illustrate the contact and force pattern between rocker member and link plate of a link plate opening of the chain shown in FIG. 6.

In a direct comparison, FIG. 9 shows the conditions of the plate-link chain in accordance with the invention. At the same swing-back moment $M_{BACK}$, force $F_2$ is significantly smaller than force $F_1$; in the present case $F_1$ is 2.3 times as great as force $F_2$. Thus the upward shift in position of contact region A reduces the contact force between rocker member 17 and the surface of link plate opening 19 by more than half, with the same swing-back moment. The load on the link plate due to the contact is reduced accordingly, and thus the service life of the link plate and hence the overall service life of the plate-link chain is increased.

Between the lower contact surface 22 of opening 19 of link plate 16 and the lower contact surface 23 of rocker member 17 a widening clearance 25 is formed, starting from a contact position 24 between lower contact surface 22 and lower contact surface 23, so that no transmission of force occurs in the clearance region between the two lower contact surfaces 22 and 23 due to the swing-back moment $M_{BACK}$. Clearance 25 is established between lower contact surface 23 of rocker member 17 and lower contact surface 22 of the link plate opening, which clearance enlarges from the lower contact surface to the inwardly-curved region.

Referring once again to the known chain shown in FIG. 1, because of the small distance between the point of application of force $F_1$ and the contact location 24' (see FIG. 8) between rocker member 4 and the opening of link plate 1, the swing-back moment $M_{BACK}$ results in a very short force lever arm, and consequently to a large force $F_1$. In the arrangement in accordance with the present invention as shown in FIG. 9, and for the same swing-back moment $M_{BACK}$, because of the significantly greater distance between contact position 24 and the point of application of force $F_2$, with the resulting significantly greater lever arm, the same swing-back moment $M_{BACK}$ can be kept in equilibrium by the significantly smaller force $F_2$.

As a result, not only is there accomplished with the plate-link chain in accordance with the present invention a shift of the contact region A away from the stress-critical region 9 shown in FIG. 3, but there is also achieved a significant reduction of the force between rocker member and link plate that holds the swing-back moment $M_{BACK}$ in equilibrium. Because of the reduction of the force between the rocker member and the link plate, the surface pressure acting on the link plate decreases, and the opening of the link plate is thereby subjected to a smaller total stress profile.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a motor vehicle drive system, said chain comprising: a plurality of link plates hingedly connected with each other by rocker members, wherein the rocker members extend transversely to the longitudinal direction of the plate-link chain and are positioned in openings in the link plates, wherein the rocker members and link plates include respective upper and lower curved-shaped contact surfaces along which the rocker members and link plates are in contact with each other to transmit power, the contact surfaces of the link plate openings being concavely curved and spaced from each other and the contact surfaces of the rocker members being convexly curved and spaced from each other, pairs of contacting rocker members extending within respective link plate openings, the rocker members of each rocker member pair having respective curved-shaped rolling surfaces along which the rocker members roll against each other and contact each other at rolling surface contact points to transmit power, wherein the rocker members are shaped asymmetrically in a height direction of the rocker members, wherein the height direction is perpendicular to a transverse plane passing through a rocker member pair cross section and containing a line of respective successive rolling surface contact points in a direction extending in the longitudinal direction of the plate-link chain when the chain is in a linear extended condition, wherein in the longitudinal direction of the chain when it is linearly extended each of the rocker members are wider in an upper half of the rocker members above the transverse plane than in a lower half of the rocker members below the transverse plane, wherein the contact surfaces of the rocker members and link plates are provided at spaced upper and lower contact surface regions respectively above and below the transverse plane, wherein the link plate openings have an inwardly-curved region between the upper and lower contact surface regions at each contact surface region of the link plate openings and located above the contact point line that extends through the contact points of the rolling surfaces of pairs of rocker members in rolling-surface to rolling-surface contact with each other and that roll against each other, wherein when a portion of the chain is curved and has a center of curvature that lies outside of the plate-link chain when the chain is in a closed condition the upper curved-shaped contact surfaces of the rocker members contact the inwardly-curved regions of respective ones of the link plate openings and a clearance space is established between a lower contact surface of a rocker member and a lower contact surface of the link plate opening, which clearance space enlarges starting from the lower contact surface to the inwardly-curved region.

2. The plate-link chain in accordance with claim 1, wherein the rocker members have a back surface that contacts the inwardly-curved regions of the link plates in such a way that bearing surfaces are established between the back surfaces and the inwardly-curved regions of the link plates.

3. The plate-link chain in accordance with claim 1, wherein the inwardly-curved region is a projection from a concavely-extending portion of an outwardly convex peripheral rim of the link plate.

4. The plate-link chain in accordance with claim 2, wherein the back surfaces of the rocker members and the inwardly-curved regions of the link plates are configured in such a way that starting from a predetermined threshold value of a swing-back angle of a portion of the plate-link chain, the back surfaces contact the inwardly-curved regions of adjacent link plates.

5. A link plate for a plate-link chain in accordance with claim 1, wherein each link plate includes two openings to receive respective pairs of contacting rocker members, wherein each opening has a region that extends in an inward direction from a peripheral rim of the opening.

6. The plate-link chain in accordance with claim 1, wherein the plate-link chain is a toothed chain.

* * * * *